(12) United States Patent
Keppeler (10) Patent No.: US 10,094,265 B2
(45) Date of Patent: Oct. 9, 2018

(54) METHOD FOR MONITORING THE FORMATION OF NITROGEN DIOXIDE AT AN OXIDATION CATALYTIC CONVERTER, AND EXHAUST SYSTEM

(71) Applicant: Daimler AG, Stuttgart (DE)

(72) Inventor: Berthold Keppeler, Owen (DE)

(73) Assignee: Daimler AG, Stuttgart (DE)

( * ) Notice: Subject to any disclaimer, the term of this patent is extended or adjusted under 35 U.S.C. 154(b) by 360 days.

(21) Appl. No.: 14/647,046

(22) PCT Filed: Oct. 1, 2013

(86) PCT No.: PCT/EP2013/002949
§ 371 (c)(1),
(2) Date: May 22, 2015

(87) PCT Pub. No.: WO2014/079523
PCT Pub. Date: May 30, 2014

(65) Prior Publication Data
US 2015/0275737 A1 Oct. 1, 2015

(30) Foreign Application Priority Data
Nov. 24, 2012 (DE) ........................ 10 2012 022 944

(51) Int. Cl.
*F01N 3/00* (2006.01)
*F01N 3/02* (2006.01)
(Continued)

(52) U.S. Cl.
CPC ............ *F01N 11/00* (2013.01); *F01N 3/0231* (2013.01); *F01N 3/035* (2013.01); *F01N 3/106* (2013.01);
(Continued)

(58) Field of Classification Search
CPC ................. F01N 11/00; F01N 2550/02; F01N 2560/026; F01N 2610/02;
(Continued)

(56) References Cited

U.S. PATENT DOCUMENTS 8,516,799 B2 * 8/2013 Hepburn ................. F01N 3/021
60/274
2009/0132153 A1 5/2009 Shutty et al.
(Continued)

FOREIGN PATENT DOCUMENTS

DE 10 2009 010 517 A1 8/2010
DE 10 2010 040 678 A1 3/2012
(Continued)

OTHER PUBLICATIONS

PCT/EP2013/002949, International Search Report dated Dec. 11, 2013 (Two (2) pages).
(Continued)

*Primary Examiner* — Audrey K Bradley
*Assistant Examiner* — Diem Tran
(74) *Attorney, Agent, or Firm* — Crowell & Moring LLP (57) ABSTRACT

A method and device for monitoring the formation of nitrogen dioxide at an oxidation catalytic converter is disclosed. The conversion of the nitrogen oxides, corresponding to a first exhaust gas volume flowrate through the oxidation catalytic converter, is detected. The exhaust gas volume flowrate is then changed and the conversion of the nitrogen oxides which changes with the change in the exhaust gas volume flowrate is also detected. By reference to the respective conversion of the nitrogen oxides at the different exhaust gas flowrates through the oxidation catalytic converter, it is concluded, on the basis of a predetermined relationship between the conversion of the nitrogen oxides and a proportion of nitrogen dioxide in the nitrogen (Continued)

oxides in the exhaust gas, that nitrogen dioxide is being formed at the oxidation catalytic converter.

11 Claims, 3 Drawing Sheets

(51) Int. Cl.

| | |
|---|---|
| *F01N 3/10* | (2006.01) |
| *F02M 26/06* | (2016.01) |
| *F01N 11/00* | (2006.01) |
| *F01N 3/20* | (2006.01) |
| *F01N 3/023* | (2006.01) |
| *F01N 3/035* | (2006.01) |
| *F02D 41/00* | (2006.01) |
| *F02D 41/14* | (2006.01) |
| *F02M 26/05* | (2016.01) |
| *F02M 26/15* | (2016.01) |
| *F02D 41/02* | (2006.01) |

(52) U.S. Cl.
CPC ....... *F01N 3/2066* (2013.01); *F02D 41/0055* (2013.01); *F02D 41/0065* (2013.01); *F02D 41/1463* (2013.01); *F02M 26/05* (2016.02); *F02M 26/06* (2016.02); *F02M 26/15* (2016.02); *F01N 2550/02* (2013.01); *F01N 2560/026* (2013.01); *F01N 2610/02* (2013.01); *F01N 2900/0416* (2013.01); *F01N 2900/1402* (2013.01); *F01N 2900/1411* (2013.01); *F01N 2900/1621* (2013.01); *F02D 41/029* (2013.01); *Y02A 50/2325* (2018.01); *Y02T 10/24* (2013.01); *Y02T 10/47* (2013.01)

(58) Field of Classification Search
CPC ..... F01N 2900/1411; F01N 2900/1621; F01N 3/0231; F01N 3/035; F01N 3/106; F01N 3/2066; F02D 41/0055; F02D 41/0065; F02D 41/029; F02D 41/1463; F02M 26/05; F02M 26/06; F02M 26/15; Y02T 10/24; Y02T 10/47
USPC .......... 60/276, 277, 278, 285, 297, 301, 311
See application file for complete search history.

(56) References Cited

U.S. PATENT DOCUMENTS

| | | |
|---|---|---|
| 2009/0158813 A1 | 6/2009 | Bartley |
| 2012/0006007 A1* | 1/2012 | Maus ...................... F01N 3/106 60/274 |
| 2012/0060476 A1 | 3/2012 | Pfister |

FOREIGN PATENT DOCUMENTS

| | | |
|---|---|---|
| DE | 10 2010 050 406 A1 | 5/2012 |
| EP | 2 525 060 A2 | 11/2012 |
| WO | WO 2009/092429 A1 | 7/2009 |
| WO | WO 2012/117183 A1 | 9/2012 |

OTHER PUBLICATIONS

PCT/EP2013/002949, German-language PCT/ISA/237 (Five (5) pages).
German Search Report dated Jun. 28, 2013, with Statement of Relevancy (Six (6) pages).

\* cited by examiner

METHOD FOR MONITORING THE FORMATION OF NITROGEN DIOXIDE AT AN OXIDATION CATALYTIC CONVERTER, AND EXHAUST SYSTEM

BACKGROUND AND SUMMARY OF THE INVENTION

The invention relates to a method for monitoring the formation of nitrogen oxide in an oxidation catalytic converter arranged in an exhaust gas system of a vehicle. By means of an exhaust gas aftertreatment device, a content of nitrogen oxides in the exhaust gas is reduced by converting the nitrogen oxides, and the content of nitrogen oxides in the exhaust gas is measured. Furthermore, the invention relates to an exhaust gas system for a vehicle.

The nitrogen dioxide content in the exhaust gas which flows into an exhaust gas aftertreatment device which is designed to reduce the content of nitrogen oxides in the exhaust gas, for example an SCR catalytic converter, affects the activity of the exhaust gas aftertreatment device with regard to the conversion of the nitrogen oxides. In the SCR reaction (selective catalytic reduction) in the SCR catalytic converter, the selective catalytic reduction reaction of nitrogen oxides with ammonia to form nitrogen and water depends on the nitrogen dioxide content due to different reaction paths for nitrogen monoxide and nitrogen dioxide. Because of statutory regulations, for example of the US American environmental authorities, the formation of nitrogen dioxide at the oxidation catalytic converter must be monitored as part of an on-board diagnostics system.

US 2009/0158813 A1 describes a method for monitoring an oxidation catalytic converter with regard to the formation of nitrogen dioxide, in which sensors arranged upstream and downstream of the oxidation catalytic converter respond differently to nitrogen monoxide and nitrogen dioxide. In this way, the formation of nitrogen dioxide at the oxidation catalytic converter is to be inferred based on the sensor signals.

As, however, the nitrogen dioxide content cannot be measured directly by means of a sensor, this method is subject to a certain inaccuracy.

Possible ways of indirectly determining the nitrogen dioxide formation at the oxidation catalytic converter, for example by determining the activity of the oxidation catalytic converter with regard to oxidation based on exothermic monitoring, likewise provide only comparatively inaccurate results. The same applies to the estimation of the activity of an SCR catalytic converter with the help of nitrogen oxide sensors, from which a nitrogen dioxide concentration is to be estimated. A reliable diagnosis of the nitrogen dioxide formation at the oxidation catalytic converter is also impossible by this means.

The object of the present invention is therefore to create a method of the kind mentioned in the introduction and an exhaust gas system for carrying out the method which enables the formation of nitrogen dioxide to be monitored particularly reliably.

With the method according to the invention, first of all, the conversion of nitrogen oxides corresponding to a first exhaust gas volume flow through the oxidation catalytic converter is measured. The exhaust gas volume flow is then varied and the conversion of nitrogen oxides which changes with the variation of exhaust gas volume flow is measured. The formation of nitrogen dioxide at the oxidation catalytic converter is inferred based on the respective conversion of nitrogen oxides at the different exhaust gas volume flows through the oxidation catalytic converter. In doing so, a predetermined relationship between the conversion of the nitrogen oxides and a proportion of nitrogen dioxide in the nitrogen oxides in the exhaust gas is taken into account.

This is based on the knowledge that the formation of nitrogen dioxide at the oxidation catalytic converter responds very sensitively to a change in the space velocity at the oxidation catalytic converter. The space velocity is the ratio of exhaust gas volume flow and volume of the oxidation catalytic converter and is usually expressed in the units "per hour." An increase in the space velocity causes a reduction in the formation of nitrogen dioxide and vice versa. Here, this dependency of the formation of nitrogen dioxide at the oxidation catalytic converter on the exhaust gas volume flow through the oxidation catalytic converter is used to carry out a credible, that is to say particularly reliable, monitoring or diagnosis of the formation of nitrogen dioxide. A change in the exhaust gas volume flow namely leads to a change in the formation of nitrogen dioxide at the oxidation catalytic converter. As a result of this, the conversion behavior of the exhaust gas aftertreatment device varies, and these changes in the conversion of nitrogen oxides in the exhaust gas aftertreatment device can be measured by means of sensors designed for measuring the content of nitrogen oxides in the exhaust gas.

The formation of nitrogen dioxide at the oxidation catalytic converter connected upstream of the exhaust gas aftertreatment device can be inferred particularly accurately and reliably based on a known relationship between its nitrogen oxide conversion behavior and the nitrogen dioxide to nitrogen oxide ratio ($NO_2/NO_x$) which is known for the particular type of exhaust gas aftertreatment device. The nitrogen dioxide formation activity of the oxidation catalytic converter can therefore be inferred by means of the dependency of the activity of the exhaust gas aftertreatment device with regard to the conversion of nitrogen oxides on the nitrogen dioxide content in the exhaust gas. This enables the formation of nitrogen dioxide at the oxidation catalytic converter to be monitored particularly reliably. Here, the exhaust gas aftertreatment device preferably comprises at least one exhaust gas treatment component in the form of an SCR catalytic converter which, in a selective catalytic reduction of nitrogen oxides with ammonia, is able to catalyze to form predominantly nitrogen under oxidizing conditions. In doing so, the exhaust gas aftertreatment device is arranged downstream of the oxidation catalytic converter.

In a particularly advantageous embodiment of the invention, the exhaust gas volume flow through the oxidation catalytic converter is varied by varying a proportion of a low-pressure exhaust gas recirculation rate of a total exhaust gas recirculation rate. The total exhaust gas recirculation rate is made up of a high-pressure exhaust gas recirculation rate and the low-pressure exhaust gas recirculation rate. With high-pressure exhaust gas recirculation, the recirculating exhaust gas is diverted out of the exhaust gas flow before reaching the oxidation catalytic converter and introduced into the inlet air downstream of a compressor which compresses the inlet air for an internal combustion engine of the vehicle. On the other hand, with low-pressure exhaust gas recirculation, a partial flow of the exhaust gas is diverted out of the exhaust gas flow downstream of the exhaust gas aftertreatment device and therefore also downstream of the oxidation catalytic converter and introduced into the inlet air upstream of the compressor.

If, for a certain total exhaust gas recirculation rate, the low-pressure exhaust gas recirculation rate is now increased, then the high-pressure exhaust gas recirculation rate reduces. This leads to less exhaust gas being diverted upstream of the oxidation catalytic converter. As a result, the exhaust gas volume flow through the oxidation catalytic converter increases. This occurs without a driver of the vehicle noticing this increase in the exhaust gas volume flow through the oxidation catalytic converter. The space velocity can therefore be varied very easily and reliably by varying the low-pressure exhaust gas recirculation rate, thus affecting the formation of nitrogen dioxide at the oxidation catalytic converter. The conversion of nitrogen oxides in the exhaust gas aftertreatment device, which is dependent thereon, can then be measured with the help of nitrogen oxide sensors. This enables the formation of nitrogen dioxide at the oxidation catalytic converter to be monitored unobtrusively and, at the same time, reliably when driving.

It has been shown to be further advantageous when an ageing state of the oxidation catalytic converter is inferred by comparing the determined formation of nitrogen dioxide at the oxidation catalytic converter with an expected formation of nitrogen dioxide for the respective exhaust gas volume flows. Namely, if the actual nitrogen dioxide formation does not correspond to the expected nitrogen dioxide formation, then this is to be assessed as an index for an ageing and therefore deterioration of the conversion rate of the oxidation catalytic converter. If the ageing state of the oxidation catalytic converter is associated with a particularly large reduction in the formation of nitrogen dioxide, then the oxidation catalytic converter can be recognized as being defective. Accordingly, the attention of a vehicle user can be drawn to the need to replace the oxidation catalytic converter.

Preferably, the conversion of nitrogen oxides is defined for the different exhaust gas volume flows, while a temperature is present at the exhaust gas aftertreatment device such as is established at the exhaust gas aftertreatment device during the thermal regeneration of a particulate filter arranged in the exhaust gas system. During regeneration of the particulate filter, particularly high temperatures, in particular temperatures of more than 500° C., are present, namely upstream of the exhaust gas aftertreatment device. At these temperatures, an exhaust gas aftertreatment device in the form of an SCR catalytic converter no longer has any capacity for storing ammonia. In addition, the equilibrium reaction at the oxidation catalytic converter:

is thermodynamically shifted almost completely towards nitrogen monoxide.

Setting up conditions such as those which exist during the thermal regeneration of the particulate filter therefore ensures that external factors, such as the proportion of nitrogen dioxide in the exhaust gas which is fed to the exhaust gas aftertreatment device and the loading of the exhaust gas aftertreatment device with ammonia, have no disruptive or adulterating affect on the activity of the exhaust gas aftertreatment device during conversion of the nitrogen oxides. The conversion of nitrogen oxides by means of the exhaust gas aftertreatment device can therefore be determined at a temperature of more than 500° C. on the intake side of the exhaust gas aftertreatment device without disruptive frame conditions in the exhaust gas due to stored ammonia or due to the nitrogen dioxide content.

When determining the conversion of the nitrogen oxides at the different exhaust gas volume flows, it is therefore favorable when conditions such as those which occur in the course of an active thermal regeneration of the particulate filter are present. However, it is of particular advantage when the particulate filter has actually been regenerated, that is to say when the conversion of the nitrogen oxides at the different exhaust gas volume flows is determined particularly directly following the thermal regeneration of the particulate filter. Namely, there is then no carbon black loading in the particulate filter, which could likewise have a disruptive effect on the activity of the exhaust gas aftertreatment device. The conversion of the nitrogen oxides by means of the exhaust gas aftertreatment device can also be determined during the thermal regeneration of the particulate filter, in that the nitrogen oxide content in the exhaust gas is measured at least after the exhaust gas aftertreatment device and the measured value compared with a nitrogen oxide content which is present before the exhaust gas aftertreatment device.

Here, it has been shown to be advantageous when an ammonia content in the exhaust gas before thermal regeneration or after thermal regeneration of the particulate filter is taken into account when measuring the conversion of nitrogen oxides. The nitrogen oxide conversion is namely dependent on the ratio of the ammonia contained in the exhaust gas to the nitrogen oxide contained in the exhaust gas. This ratio is also referred to as alpha. The quality of the evaluation can be improved by varying alpha, as the conversion of nitrogen oxides depends on alpha. This diagnosis can be carried out, particularly in advance of the thermal regeneration of the particulate filter, which is to say in the heating-up phase, and/or in the concluding cooling phase.

It has been shown to be further advantageous when a temperature at the exhaust gas aftertreatment device is taken into account when applying the predetermined relationship between the conversion of the nitrogen oxides and the proportion of nitrogen dioxide in the nitrogen oxides in the exhaust gas. The ratio of nitrogen dioxide and nitrogen oxide corresponding to the nitrogen oxide conversion behavior is namely dependent on the temperature of the exhaust gas aftertreatment device. Taking into account the temperature therefore enables the formation of nitrogen dioxide at the oxidation catalytic converter to be inferred particularly accurately and realistically.

Preferably, a temperature-dependent correlation curve, which takes into account the formation of nitrogen dioxide at the oxidation catalytic converter at the different exhaust gas volume flows, is determined. This correlation curve is compared with an expected curve. Comparing the curves enables the variation of the formation of nitrogen dioxide at the oxidation catalytic converter due to age to be inferred particularly well.

Finally, it has been shown to be advantageous when the conversion rates of the nitrogen oxides corresponding to the respective exhaust gas volume flow through the oxidation catalytic converter are measured in a driving mode in which substantially constant driving speeds and/or substantially constant loads of an internal combustion engine of the vehicle are present. Namely, this enables disruptive influences due to significantly varying driving speeds or significantly varying loads to be particularly extensively excluded. It is namely expedient to monitor the formation of nitrogen dioxide in quasi-steady-state operation of the internal combustion engine.

The exhaust gas system according to the invention for a vehicle comprises an oxidation catalytic converter and an exhaust gas aftertreatment device arranged downstream of the oxidation catalytic converter for reducing a content of nitrogen oxides in the exhaust gas by converting the nitrogen oxides. Furthermore, at least one measuring device for measuring the content of the nitrogen oxides in the exhaust gas is provided. Furthermore, the exhaust gas system comprises a control device which is designed to infer the formation of nitrogen dioxide at the oxidation catalytic converter based on a predetermined relationship between the conversion of the nitrogen oxides and a proportion of nitrogen dioxide in the nitrogen oxides in the exhaust gas. For this purpose, the control device is designed to process measured values from the at least one measuring device which specify the conversion of the nitrogen oxides corresponding to a first exhaust gas volume flow through the oxidation catalytic converter and the changing conversion of the nitrogen oxides with the variation of the exhaust gas volume flow at changed exhaust gas volume flow. A particularly reliable monitoring of the formation of nitrogen dioxide at the oxidation catalytic converter can be achieved with such an exhaust gas system.

The advantages and preferred embodiments described for the method according to the invention also apply to the exhaust gas system according to the invention and vice versa.

The characteristics and combinations of characteristics stated above in the description and the characteristics and combinations of characteristics stated below in the description of the figures and/or shown in the figures alone can be used not only in the specified combination in each case, but also in other combinations or in isolation without departing from the scope of the invention.

Further advantages, characteristics and details of the invention can be seen from the claims, the following description of preferred embodiments and with reference to the drawings.

DETAILED DESCRIPTION OF THE DRAWINGS

Figure 1:
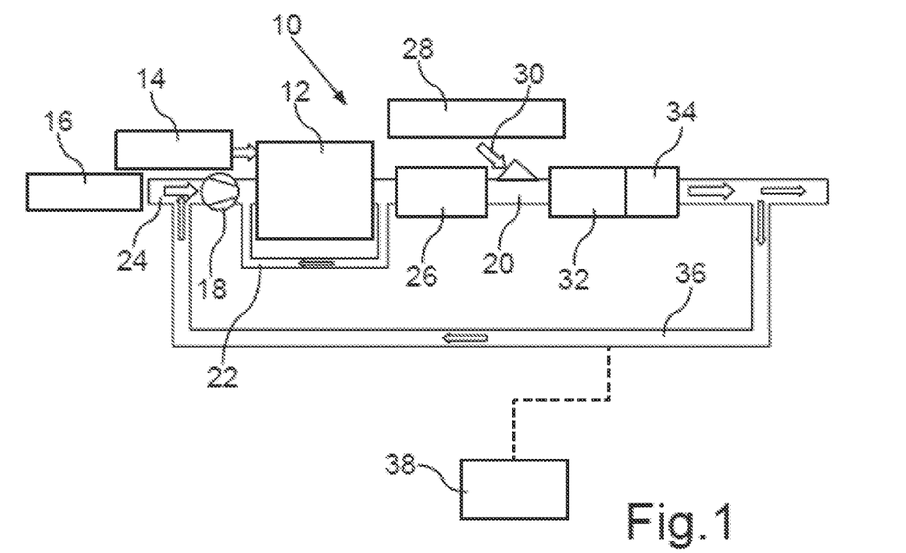
FIG. 1 shows an exhaust gas system of a vehicle, in which the formation of nitrogen dioxide at an oxidation catalytic converter is affected by varying a low-pressure exhaust gas recirculation rate, and the associated change in conversion of nitrogen oxides in an SCR catalytic converter is measured, wherein the activity of the oxidation catalytic converter with regard to the formation of nitrogen dioxide is inferred based on these measured values.

An exhaust gas system 10 of a vehicle, which, in particular, can be a commercial vehicle, is shown schematically in FIG. 1. Fuel 14 is fed to a combustion engine 12 as well as combustion air 16, which is compressed by means of a compressor 18 upstream of the combustion engine 12. A high-pressure exhaust gas recirculation pipe 22 branches off an exhaust gas pipe 20 of the exhaust gas system 10 downstream of the combustion engine 12. Via this high-pressure exhaust gas recirculation pipe 22, exhaust gas is fed back into an intake air tract 24, via the inlet of which the combustion air 16 is sucked in. The high-pressure exhaust gas recirculation pipe 22 opens out into the intake air tract 24 downstream of the compressor 18.

An oxidation catalytic converter 26, which here is designed as a diesel oxidation catalytic converter, is arranged downstream of the branch of the high-pressure exhaust gas recirculation pipe 22 from the exhaust gas pipe 20. Downstream of the oxidation catalytic converter 26, a urea-water solution 28 is introduced into the exhaust gas flowing through the exhaust gas pipe 20 by means of a dosing unit 30. The exhaust gas then flows through a particulate filter 32, which, here, is arranged together with an SCR catalytic converter 34 downstream of the particulate filter 32 in a common structural unit of the exhaust gas system 10.

Here, the particulate filter 32 is provided in some areas with a coating which acts as an SCR catalytic converter. The ammonia originating from the urea of the urea-water solution 28 is converted with nitrogen oxides from the exhaust gas in the SCR catalytic converter 34 or in the coated particulate filter 32 to form nitrogen and water in a selective catalytic reduction reaction (SCR=selective catalytic reduction). Accordingly, the nitrogen oxide content in the exhaust gas is reduced by means of the SCR catalytic converter 34. Here, the SCR catalytic converter 34 is arranged comparatively close to the engine.

Downstream of the SCR catalytic converter 34, a low-pressure exhaust gas recirculation pipe 36 branches off the exhaust gas pipe 20. This opens out into the intake air tract 24 upstream of the compressor 18. A so-called ammonia trap catalytic converter, which prevents ammonia escaping from the exhaust gas system 10 into the environment when it is not fully converted in the SCR catalytic converter 34, can be connected before the output of the low-pressure exhaust gas recirculation pipe 36. A particulate filter which is designed merely to hold back particles from the exhaust gas can also be provided instead of an SCR-active particulate filter 32.

Here, as part of an on-board diagnostic system, the activity of the oxidation catalytic converter 26, that is to say its ability to form nitrogen dioxide, is to be determined by means of a control device 38. The proportion of nitrogen dioxide in the exhaust gas downstream of the oxidation catalytic converter 26 namely has an effect on how well the SCR catalytic converter 34 can convert the nitrogen oxides from the exhaust gas to nitrogen and water. This conversion rate, which can be achieved with the SCR catalytic converter 34 and, here, with the coated particulate filter 32, is measured by means of nitrogen oxide sensors (not shown), the measured values of which are transmitted to the control device 38.

Here, the formation of nitrogen dioxide at the oxidation catalytic converter 26 is affected by varying the space velocity. The space velocity describes the ratio of the exhaust gas volume flow through the oxidation catalytic converter 26 in relation to the volume of the oxidation catalytic converter 26. Increasing the exhaust gas volume flow and therefore increasing the space velocity causes a reduction in the formation of nitrogen dioxide at the oxidation catalytic converter 26. Conversely, a reduction in the space velocity leads to an increase in the formation of nitrogen dioxide at the oxidation catalytic converter 26. However, the oxidation catalytic converter 26 also responds very sensitively to temperature with regard to the formation of nitrogen dioxide. A temperature reduction at the oxidation catalytic converter 26 therefore likewise leads to a reduction in the formation of nitrogen dioxide. At particularly high temperatures, for example at temperatures of more than 300° C., the maximum formation of nitrogen dioxide is limited by the thermodynamic equilibrium.

Here, the space velocity is increased by increasing the low-pressure exhaust gas recirculation rate, that is to say the proportion of the total exhaust gas recirculation flowing through the low-pressure exhaust gas recirculation pipe 36. For constant total exhaust gas recirculation rate, the consequence of an increase in the low-pressure exhaust gas recirculation rate at the expense of the high-pressure exhaust gas recirculation rate is namely that less exhaust gas is diverted upstream of the oxidation catalytic converter 26. More exhaust gas then flows to the oxidation catalytic converter 26 and the space velocity increases. For a given total exhaust gas recirculation rate, the proportion of the low-pressure exhaust gas recirculation rate can also be increased by reducing the proportion of the high-pressure exhaust gas recirculation rate of the total exhaust gas recirculation rate. As a further advantage, a constant total exhaust gas recirculation rate provides an at least approximately constant $NO_X$ raw emission during a diagnostic process.

Here, the formation of nitrogen dioxide at the oxidation catalytic converter 26 is therefore affected by varying the low-pressure exhaust gas recirculation portion of the total exhaust gas recirculation rate. As a result, the nitrogen oxide conversion behavior of the SCR catalytic converter 34 which can be measured by means of the nitrogen oxide sensors varies.

Figure 2:
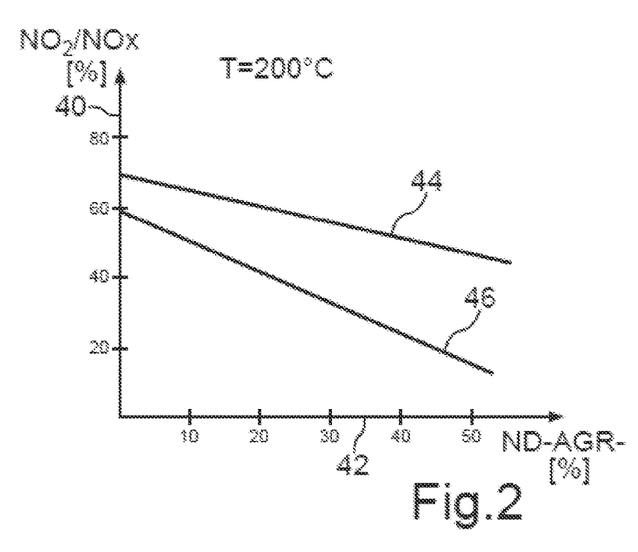
FIG. 2 shows, schematically, the dependence of the nitrogen dioxide formation of the oxidation catalytic converter on the low-pressure exhaust gas recirculation rate and the ageing of the oxidation catalytic converter at a temperature of 200° C.

The relationship between the formation of nitrogen oxide as a function of the proportion of the low-pressure exhaust gas recirculation rate of the total exhaust gas recirculation rate and the ageing state of the oxidation catalytic converter 26 for a temperature T of 200° C. is shown schematically in FIG. 2. Here, the proportion of the nitrogen dioxide in the nitrogen oxides in the exhaust gas is shown on an ordinate 40, and the low-pressure exhaust gas recirculation rate in percent of the total exhaust gas recirculation rate is shown on an abscissa 42.

A first straight line 44 describes the behavior of the unaged oxidation catalytic converter 26, that is to say one which has its full nitrogen-dioxide-forming capability. Here, it must be noted that the proportion of nitrogen dioxide in the exhaust gas which is fed to the SCR catalytic converter 34 reduces with increasing low-pressure exhaust gas recirculation rate and therefore associated increasing space velocity. A further straight line 46 illustrates the behavior of the aged oxidation catalytic converter 26 at 200° C. Generally lower nitrogen dioxide contents can be achieved here, and these contents reduce to a greater extent with increasing low-pressure exhaust gas recirculation rate than in the case of the unaged oxidation catalytic converter 26.

Figure 3:
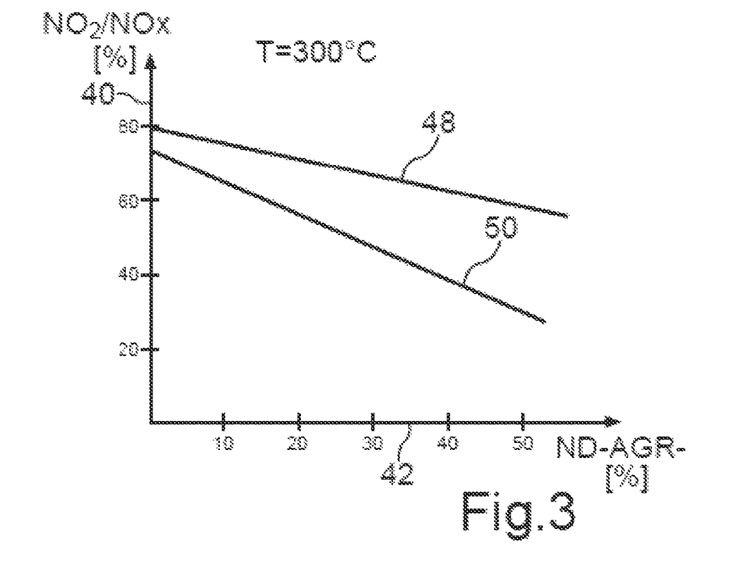
FIG. 3 shows, schematically, the dependence of the nitrogen dioxide formation of the oxidation catalytic converter on the low-pressure exhaust gas recirculation rate and the ageing of the oxidation catalytic converter at a temperature of 300° C.

FIG. 3 shows an analogous relationship based on a corresponding straight line 48 for the unaged oxidation catalytic converter 26 and, below it, a more steeply falling straight line 50 for the aged oxidation catalytic converter 26 at a temperature of 300° C.

It can be seen from FIG. 2 and FIG. 3 that, in the case of high low-pressure exhaust gas recirculation rates, that is to say in particular with a proportion of the low-pressure exhaust gas recirculation rate of 50%, but already with a content of the low-pressure exhaust gas recirculation rate of more than 30%, the proportion of nitrogen dioxide formed downstream of the oxidation catalytic converter 26 reduces by up to 20% compared with a setting of a proportion of the low-pressure exhaust gas recirculation rate of approx. 20% of the total exhaust gas recirculation rate.

This applies particularly to the aged oxidation catalytic converter 26, the behavior of which is illustrated by the straight lines 46, 50 in FIG. 2 and FIG. 3. The conversion of nitrogen oxides at the SCR catalytic converter 34 then falls to a lower value due to the high low-pressure exhaust gas recirculation rates, namely due to the unfavorable ratio of nitrogen dioxide to the nitrogen oxides in the exhaust gas. In addition, this also has a negative effect on the conversion of the nitrogen oxides in the SCR catalytic converter 34 in that a higher space velocity occurs at the SCR catalytic converter 34 when high low-pressure exhaust gas recirculation rates are set.

The formation of nitrogen dioxide at the oxidation catalytic converter 26 is therefore affected by varying the low-pressure exhaust gas recirculation rate. The conversion of nitrogen oxides at the SCR catalytic converter 34, which is dependent thereon, is measured by means of the nitrogen oxide sensors. The nitrogen dioxide formation activity of the oxidation catalytic converter 26 can then be inferred as a result of the dependency of the activity of the SCR catalytic converter 34 on the proportion of nitrogen dioxide in the exhaust gas.

The space velocity at the oxidation catalytic converter 26 can also be maintained virtually constant in a limited load range by varying a distribution of the proportions of the high-pressure and the low-pressure exhaust gas recirculation. This provides favorable frame conditions for various on-board diagnostic approaches in the exhaust gas aftertreatment system. Namely, the low-pressure exhaust gas recirculation rate can be reduced and the high-pressure exhaust gas recirculation rate increased by increasing the load, which is associated with an increased exhaust gas volume flow. As a result, the exhaust gas volume flow through the oxidation catalytic converter 26 does not increase.

Here, it is ensured that the activity of the SCR catalytic converter 34, which is dependent on the ageing thereof, is taken into account when monitoring the nitrogen dioxide formation capability of the oxidation catalytic converter 26. This occurs in that the determination of the conversion of nitrogen oxides at the SCR catalytic converter 34 is carried out independently of external influencing factors such as the proportion of nitrogen dioxide in the exhaust gas fed thereto and the stored ammonia. Here, namely, the conversion of nitrogen oxides at the SCR catalytic converter 34 is determined while the regeneration of the particulate filter 32 is carried out, or at least under frame conditions, in particular at temperatures at the particulate filter 32 and at the SCR catalytic converter 34, which occur in the course of a particulate filter regeneration.

Figure 4:
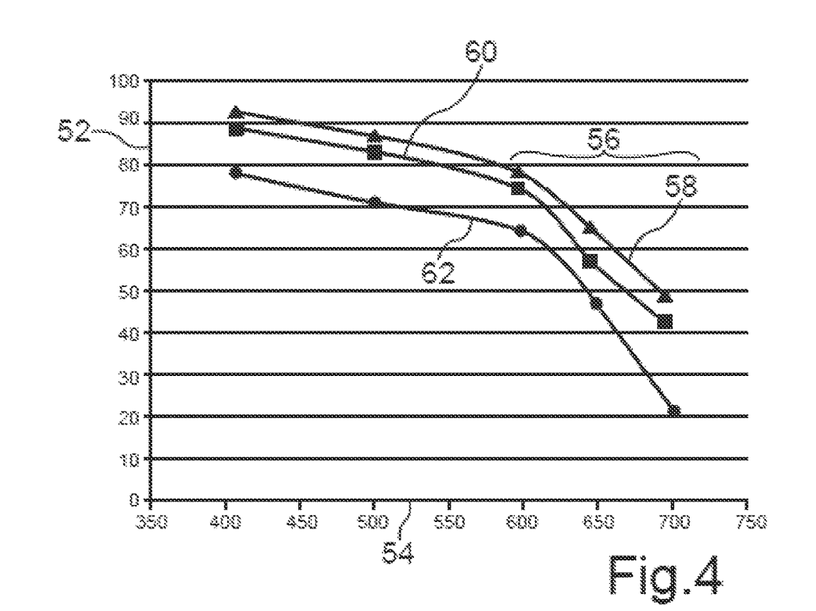
FIG. 4 shows the dependency of the nitrogen oxide conversion on the temperature at the SCR catalytic converter for different ammonia contents in the exhaust gas.

FIG. 4 illustrates the dependency of the conversion of nitrogen oxides at the SCR catalytic converter 34 on the temperature T on the input side of the particulate filter 32. Here, the nitrogen oxide conversion in percent is specified on an ordinate 52, and the temperature T in ° C. before the input to the particulate filter 32 on an abscissa 54. It can be seen from FIG. 4 that the conversion rates of nitrogen oxides reduce considerably at temperatures of more than 400° C. and in particular at temperatures of more than 500° C. A region 56 in the graph shown in FIG. 4 includes measuring points which were determined during the particulate filter regeneration. From this, it can be seen that the nitrogen oxide conversion of the SCR catalytic converter 34 reduces particularly significantly with increasing temperature during the thermal regeneration of the particulate filter 32.

The effect that the ratio of ammonia to nitrogen oxide, which is also referred to as alpha, has on the nitrogen oxide conversion, can also be seen from FIG. 4. A first curve 58 describes the conversion behavior of the SCR catalytic converter 34 for a ratio of ammonia to nitrogen oxide of 2, a second curve 60 for an alpha of 1.5, and a third curve 62 for an alpha of 1. This consideration of the proportion of ammonia results in a particularly accurate determination of the nitrogen oxide conversion at the SCR catalytic converter 34 which reflects the actual conditions.

At the high temperatures which are present during the particulate filter regeneration, in particular at temperatures of more than 500° C., the SCR catalytic converter 34 no longer has any capacity for storing ammonia and, thermodynamically, according to the reaction equation describing the formation of nitrogen dioxide at the oxidation catalytic converter 26, the nitrogen dioxide/nitrogen monoxide equilibrium:

lies virtually 100% on the side of nitrogen monoxide.

By determining the conversion rate at temperatures of more than 500° C. upstream of the particulate filter 32, the activity of the SCR catalytic converter 34 can be determined without disruptive frame conditions. For the purpose of diagnosing the formation of nitrogen dioxide at the oxidation catalytic converter 26, the nitrogen oxide conversion is then correlated with the activity of the SCR catalytic converter 34 determined under non-disruptive conditions. This is illustrated in FIG. 5.

Figure 5:
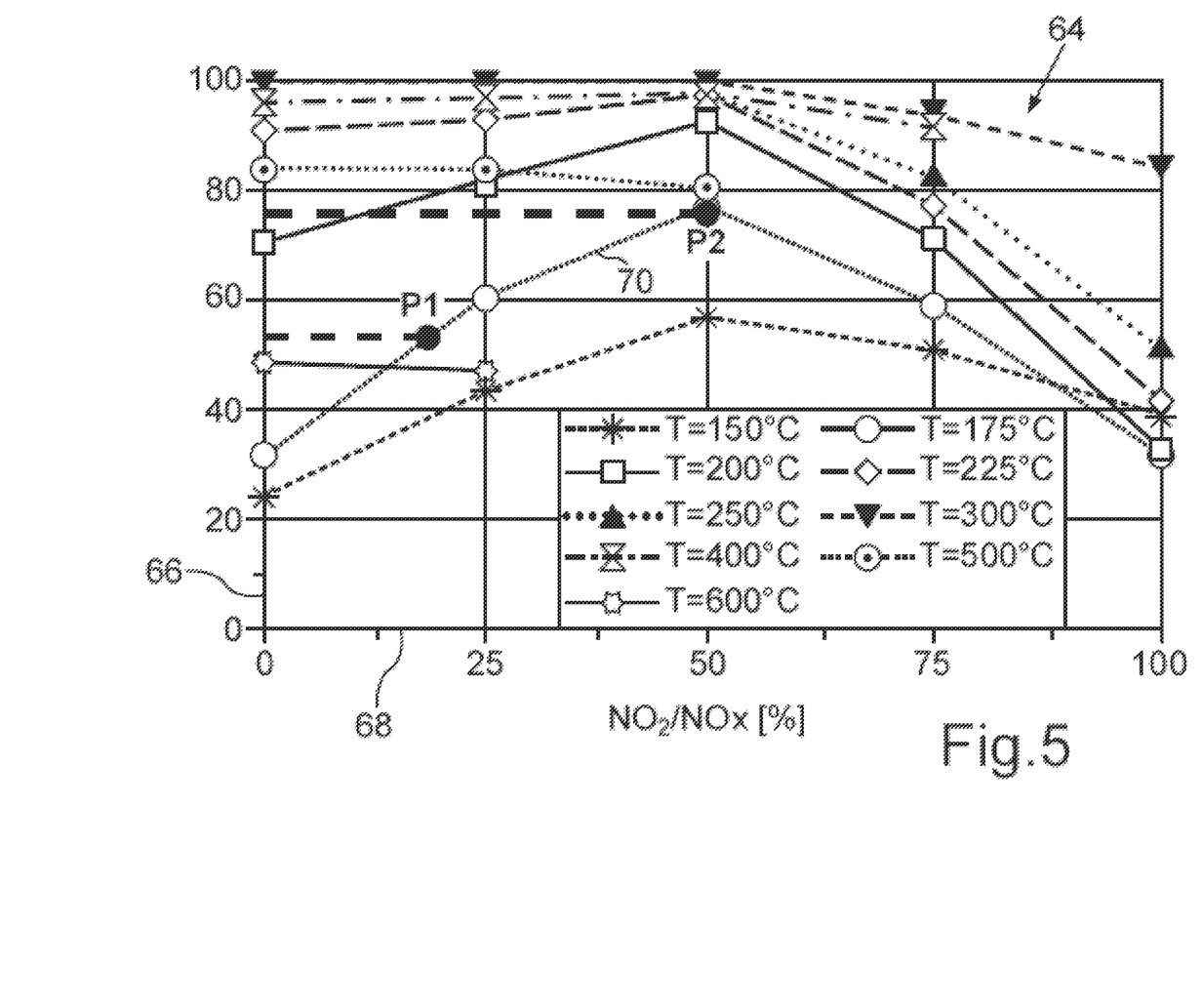
FIG. 5 shows a graph with curves, based on which the proportion of the nitrogen dioxide in the nitrogen oxides in the exhaust gas can be inferred for respective temperatures at the SCR catalytic converter of the nitrogen oxide conversion in the SCR catalytic converter.

A host 64 of curves, which specify the relationship between the nitrogen oxide conversion and the proportion of nitrogen dioxide in the nitrogen oxides in the exhaust gas for different temperatures, is depicted in a graph shown in FIG. 5. Corresponding hosts of curves are stored in the control device 38 of the exhaust gas system 10.

The nitrogen oxide conversion in percent is plotted on an ordinate 66 in the graph, and the proportion of nitrogen dioxide in the nitrogen oxides in percent is plotted on an abscissa 68. A curve 70, which describes the relationships at a temperature T of 175° C., is singled out from the host 64 of curves by way of example.

The activity of the SCR catalytic converter 34 determined under non-disruptive conditions is, for example, measured at a low-pressure exhaust gas recirculation proportion of the total exhaust gas recirculation rate of 50% over a certain time period by determining the nitrogen oxide conversion averaged within this time period. According to the curve 70, a nitrogen oxide conversion of approx. 50% is determined at this high low-pressure exhaust gas recirculation rate. This $NO_X$ conversion of 50% corresponds to a point P1 on the curve 70. The relationship between the nitrogen oxide conversion and the proportion of nitrogen dioxide in the nitrogen oxides described by the curve 70 results in a proportion of nitrogen dioxide of about 20% for the point P1.

At the same temperature of 175° C., a nitrogen oxide conversion of approx. 75% is determined when a low low-pressure exhaust gas recirculation rate of, for example, approx. 20% of the total exhaust gas recirculation rate is present. As shown by a point P2 on the curve 70, this corresponds to a proportion of nitrogen dioxide of approx. 50%. A correlation straight line is then produced from two or more such points P1, P2, as illustrated in FIG. 2 and FIG. 3 by the straight lines 44, 46, 48, 50.

If the measured conversion rates are lower than correspondingly expected nitrogen oxide conversion rates and if at the same time, the activity of the SCR catalytic converter 34 is still in order, then this leads to the conclusion that, due to an ageing of the oxidation catalytic converter 26, less nitrogen dioxide is formed thereat than is the case with an unaged system. Accordingly, the correlation straight line, which is determined by the points P1 and P2 and, if appropriate, further measurements, and which is illustrated schematically in FIG. 2 and FIG. 3 by the respective straight line 46, 50, lies below the straight lines 44, 48 for the respective unaged system.

The appropriate correlation straight-line therefore specifies the behavior of the aged oxidation catalytic converter 26. If a too-low formation of nitrogen dioxide at the oxidation catalytic converter 26 is determined, then the oxidation catalytic converter 26 is recognized as being defective.

A deterioration of the nitrogen dioxide formation at the oxidation catalytic converter 26 caused by ageing can be determined particularly well by comparing the temperature-dependent correlation straight lines with the straight lines 44, 48 expected for the unaged oxidation catalytic converter 26. This takes place by affecting the formation of nitrogen dioxide at the oxidation catalytic converter 26 by varying the low-pressure exhaust gas recirculation rate.

The invention claimed is:

1. A method for monitoring formation of nitrogen dioxide at an oxidation catalytic converter arranged in an exhaust gas system of a vehicle, in which, by an exhaust gas aftertreatment device, a content of nitrogen oxides in an exhaust gas is reduced by converting the nitrogen oxides, and the content of nitrogen oxides in the exhaust gas is measured, comprising the steps of:

the conversion of the nitrogen oxides by the exhaust gas aftertreatment device that corresponds to a first exhaust gas volume flow through the oxidation catalytic converter is measured;

the exhaust gas volume flow is varied; and a changing of the conversion of the nitrogen oxides by the exhaust gas aftertreatment device occurring with the variation of the exhaust gas volume flow is determined;

wherein, based on the respective conversion of nitrogen oxides with the different exhaust gas volume flows through the oxidation catalytic converter, the formation of nitrogen dioxide at the oxidation catalytic converter is inferred based on a predetermined relationship between the conversion of nitrogen oxides and a proportion of nitrogen dioxide in the nitrogen oxides in the exhaust gas;

wherein the exhaust gas volume flow through the oxidation catalytic converter is varied by varying a proportion of a low-pressure exhaust gas recirculation rate of a total exhaust gas recirculation rate which is made up of a high-pressure exhaust gas recirculation rate and the low-pressure exhaust gas recirculation rate;

and wherein the low-pressure exhaust gas recirculation rate is increased and the high-pressure exhaust gas recirculation rate is reduced for a constant total exhaust gas recirculation rate.

2. The method as claimed in claim 1, wherein an ageing state of the oxidation catalytic converter is inferred by comparing the inferred formation of nitrogen dioxide at the oxidation catalytic converter with an expected formation of nitrogen dioxide for the respective exhaust gas volume flows.

3. The method as claimed in claim 1, wherein the conversion of the nitrogen oxides at the different exhaust gas volume flows is determined while a temperature is present at the exhaust gas aftertreatment device as is established at the exhaust gas aftertreatment device during a thermal regeneration of a particulate filter arranged in the exhaust gas system.

4. The method as claimed in claim 1, wherein the conversion of the nitrogen oxides at the different exhaust gas volume flows is determined following a thermal regeneration of a particulate filter arranged in the exhaust gas system.

5. The method as claimed in claim 4, wherein an ammonia content in the exhaust gas before the thermal regeneration or after the thermal regeneration of the particulate filter is taken into account when determining the conversion of nitrogen oxides.

6. The method as claimed in claim 1, wherein a temperature at the exhaust gas aftertreatment device is taken into account when applying the predetermined relationship between the conversion of the nitrogen oxides and the proportion of nitrogen dioxide in the nitrogen oxides in the exhaust gas.

7. The method as claimed in claim 6, wherein a temperature-dependent correlation curve, which takes into account the formation of nitrogen dioxide at the oxidation catalytic converter at the different exhaust gas volume flows, is determined, wherein the correlation curve is compared with an expected curve.

8. The method as claimed in claim 1, wherein the conversion rates of the nitrogen oxides corresponding to the respective exhaust gas volume flows through the oxidation catalytic converter are determined in a driving mode in which constant driving speeds and/or constant loads of an internal combustion engine of the vehicle are present.

9. An exhaust gas system for a vehicle, comprising:
   an oxidation catalytic converter arranged in an exhaust gas pipe;
   an exhaust gas aftertreatment device arranged in the exhaust gas pipe downstream of the oxidation catalytic converter for reducing a content of nitrogen oxides in an exhaust gas by converting the nitrogen oxides;
   a high-pressure exhaust gas recirculation pipe branching off the exhaust gas pipe upstream of the oxidation catalytic converter;
   a low-pressure exhaust gas recirculation pipe branching off the exhaust gas pipe downstream of the exhaust gas aftertreatment device;
   at least one measuring device for measuring the content of the nitrogen oxides in the exhaust gas;
   a control device, wherein a formation of nitrogen dioxide at the oxidation catalytic converter is inferable by the control device based on a predetermined relationship between the conversion of the nitrogen oxides and a proportion of nitrogen dioxide in the nitrogen oxides in the exhaust gas, wherein, the control device processes measured values from the at least one measuring device which specify:
      a conversion of the nitrogen oxides corresponding to a first exhaust gas volume flow through the oxidation catalytic converter; and
      a changing conversion of the nitrogen oxides occurring with variation of the exhaust gas volume flow caused by varying a proportion of a low-pressure exhaust gas recirculation of a total exhaust gas recirculation rate wherein the low-pressure exhaust gas recirculation is increased and a high-pressure exhaust gas recirculation is reduced for a constant total exhaust gas recirculation rate.

10. The exhaust gas system as claimed in claim 9, wherein the exhaust gas aftertreatment device is a selective catalytic reduction (SCR) catalytic converter.

11. The exhaust gas system as claimed in claim 9, wherein the exhaust gas aftertreatment device is a particulate filter with a coating which acts as an SCR catalytic converter and an SCR catalytic converter downstream of the particulate filter.

* * * * *